United States Patent Office 3,090,764
Patented May 21, 1963

3,090,764
INTUMESCENT MASTIC COATING
Wayne P. Ellis, Springfield, Pa., and Irvin John Steltz, Collingswood, N.J., assignors to Benjamin Foster Company, Philadelphia, Pa., a corporation of Delaware
No Drawing. Filed Dec. 26, 1957, Ser. No. 705,096
3 Claims. (Cl. 260—28.5)

This invention relates to a mastic coating, the primary object of which is to provide a composition which not only resists burning and combustion when exposed to heat or fire but which also expands or intumesces. In the intumescent state the charred coating has adequate resistance to heat conductance to protect the underlying surface from rapid temperature rise during the fire exposure.

Industrial plants such as oil refineries, chemical processing plants, synthetic rubber plants, and paper mills use steel tanks of many sizes and shapes. When these tanks contain flammable or explosive liquids and gases it is desirable to protect them from the danger of bursting if they are exposed or adjacent to a fire. Not only must the tanks or other vessels themselves be protected from fire exposure but the structural steel used in their supports must likewise be protected to guard against collapse during fire exposure.

Tanks and other vessels may be protected from temperature rise during fire exposure by the application of thermal insulation in the form of molded blocks, fibrous blankets, or insulating or refractory cements. Structural steel may be protected from collapse during fire exposure by the application of fireproofing concrete or plasters suitably reinforced with steel wire or mesh. These methods of protection while highly efficient are costly. They are designed to give protection from destructive temperature rise during fire exposure for periods of 1 to 4 hours. For many years there has existed the need for a lower cost form of fire retardant protection which would prevent dangerous temperature rise in these structures for a period up to ½ hour; it being assumed that within this period fire fighting forces could be marshalled to control the blaze before destructive collapse or bursting of vessels occurred.

It is therefore another object of the invention to provide a low cost fire retardant composition which effectively serves to protect equipment from destructive temperature rise during fire exposure for a period up to ½ hour.

The use of fire retardant paints or other coatings applied in thickness comparable to that of paints is well known for the protection of wood or other cellulosic materials. These fire retardant coatings usually contain water soluble or water sensitive inorganic salts containing a relatively high percentage of water of crystallization or mechanically bound water. When exposed to a fire the contained water is suddenly vaporized by reason of its being heated above its boiling point causing the coating to swell or bloat and forming a cellular char structure which by virtue of its relatively low thermal conductivity retards the rate of temperature rise in the wood or cellulose and prevents it from reaching its ignition point. This swelling or bloating of the coating is called intumescence.

Because the intumescing agents used in these paints are water soluble or water sensitive, it is not possible to use them for the protection of structures exposed out-of-doors. If so used, the water sensitive ingredients become dissolved when exposed to rain or when exposed to prolonged periods of high humidity, absorb water and effloresce, effectively destroying their value as fire retarding agents. Sometimes these water sensitive fire retardant coatings are used outdoors by the application of an outer coat of water resistant paint or other coating to seal moisture out. This method of protection is undesirable from the standpoint of added cost and also the method has not been completely successful, because, if the protective topcoating is damaged through mechanical abuse or accident, the exposed water sensitive layer of paint then starts to deteriorate. In addition, the use of a topcoating over the intumescent coating reduces the effectiveness of intumescence.

Various other methods of protecting these water sensitive intumescent agents from deterioration and outdoor exposure have been attempted, including coating the individual particles or salt crystals with waterproof coatings, and mixing the water sensitive intumescent agents into water resistant binders, such as oil base paints or synthetic resin lacquers. These methods have not been effective, because, as the products are exposed to the deteriorating action of sunshine, rain, heat and cold, the protective coatings or binders break down permitting the water soluble or water sensitive ingredients to be leached out and the fire retardant value of the coating destroyed.

It is therefore another object of the invention to provide a fire retardant mastic coating which contains as the intumescing agent a mineral material which is substantially insoluble in water so that the mastic is not rendered ineffective through exposure to water or weather.

The insoluble mineral intumescing agent is one which contains combined water and which is capable of expanding or bloating to many times its original volume when heated. It is raw unexpanded vermiculite ore, the term "vermiculite" designating a group of minerals which have a platy, laminated structure resembling that of mica. It differs from mica principally by the fact that when heated it exfoliates to a remarkable extent in a direction at right angles to the laminae. The chemical composition of vermiculite much resembles that of biotitephlogopite mica which has had removal of much of its alkalis and taken up water. Analyses of commercial vermiculite show a rather wide variation in relative amounts of the chief constituents, but it would appear that the main factor which affects the degree of exfoliation on heating is combined water, which varies between about 4.3 and 13.8 percent.

Other mineral materials have the property of expanding in volume when heated. These materials include perlite, shale, slate, pumice, and volcanic scoria. These, however, have been found unsuitable as intumescing agents in mastic compositions. The perlite, pumice, and scoria minerals when divided finely enough to be mixed into a usable mastic probably do not retain enough combined water to cause appreciable puffing or bloating of the mastic when heated. The shale or slate minerals must be heated nearly to their fusion temperature (usually above 2000° F.). Such high temperatures are relatively slowly attained under fire conditions and the mastic binder medium becomes decomposed and charred at temperatures substantially below 1000° F. Thus the binding effect of the mastic is destroyed before the shale or slate minerals reach their bloating temperature.

In addition to its fire retardant properties, it is necessary that the protective coat adhere strongly to the surface over which it is coated. It must also have excellent resistance to deterioration by weather, water, heat and cold. It must neither flow to any appreciable extent when heated even to the point of destruction, nor becomes inelastic and embrittled after prolonged exposure to temperature as high as 200° F. Since moreover the temperature of the coating in service often varies, it should be capable of expanding and contracting without undue deterioration.

In some instances it is desirable to apply the fire retardant coating over thermal insulation blankets, blocks, or cement. Because the efficiency of many insulating materials is seriously reduced by the presence therein of water or water vapor, the fire retardant coating should desirably form a barrier at the surface of the underlying insulation against water, and preferably also against water vapor. Through the use of our invention it is possible to provide a coating compositions which yields protection against fire and weather for metal structures with or without other forms of thermal insulation, and whose properties are superior to those of known fire resistive or fire retardant coatings in some or all of these respects.

The composition of this invention consists essentially of a fire resistive mastic which does not burn or support combustion and in which water insoluble expandable mineral ore is mixed. The fire resistive mastic component of this invention may be prepared by a special procedure coming within the broad disclosures of copending application Serial No. 679,514, now U.S. Patent No. 2,861,967. The mastic which is preferred is composed of several ingredients, namely (1) an isobutylene polymer, or co-polymer, and (2) a chemical condensation product which acts inter alia as a plasticizer for said polymer or co-polymer, and whose nature will be more fully explained hereinafter. It may be noted that while the condensation product is included not solely for its plasticizing properties, it is hereinafter referred to as "the plasticizer" for the sake of convenience. Another ingredient, designed to contribute the fire retardant properties of the composition is (3) a resinous fire retardant chlorinated compound, which may be resinous chlorinated paraffin wax or resinous chlorinated biphenyl. The contained chlorine content of this ingredient will be above 50% and preferably in the range of 60 to 70%. A filler (4) which will usually be incorporated into the composition preferably consists of a mixture of fibrous and nonfibrous mineral fillers, and to facilitate application of the composition it will desirably also include a proportion of a gelling agent. Another ingredient (5) is the intumescing agent, pulverized unexpanded vermiculite ore.

According to the invention, therefore, there is provided a coating composition comprising a vehicle, fillers, and intumescing agent. Said vehicle includes from 20 to 40 percent by weight of an isobutylene polymer or co-polymer, from 20 to 60 percent by weight of plasticizer, and from 10 to 35 percent by weight of a resinous chlorinated compounds, preferably chlorinated paraffin or chlorinated biphenyl. The fillers will be 10 to 50 percent and the intumescing agent 20 to 65 percent by weight of the coating composition.

It will of course be understood that the compositions of this invention will in most, if not all, instances be diluted with an inert organic solvent, which is inert in the sense that it does not enter permanently into the composition, but evaporates after the coating has been applied. Highly acceptable solvents are for example petroleum spirits, xylol, methyl isobutyl ketone, but many others also are suitable. While the invention also includes compositions incorporating such an inert organic solvent, the relative proportions of the various ingredients given herein refer to compositions omitting any such organic solvent except where it is expressly stated to the contrary.

One specifically preferred isobutylene co-polymer for use in this invention is a well known co-polymer of isobutylene and styrene manufactured by Enjay Co. of New York City and known as S-Polymer. Another such isobutylene co-polymer is for example butyl rubber, a well known co-polymer of isobutylene containing 1 to 10 percent of isoprene. Another such isobutylene polymer is "Vistanex," a linear polyisobutylene. The "plasticizer" to be used in accordance with this invention is a chemical condensation product which has the following characteristics: an iodine number not substantially above 40, a ball and ring softening point above 110° F. and ranging up to 200° F., an average molecular weight of at least 1900, at least 40 carbon atoms per double bond, and a marked reduction in susceptibility to penetration with temperature change in the range of 30 to 60° F. It must also be virtually free of any asphaltenes, and substantially completely soluble in 88 degree Baumé naptha (as defined by the American Petroleum Institute) which is a petroleum distillate having a specific gravity of 0.645 at 60/60° F.

While the production of such chemical condensation products forms no part of this invention, it may be noted that their production is fully disclosed in U.S. Patent No. 2,337,336 and may be briefly described as follows: The chemical condensation product is derived from a natural paraffinic crude oil, such as is obtained from the western Pennsylvania oil fields. This crude paraffinic oil is not subjected to any thermal or chemical action except fractional distillation. The residue from this distillation is then dissolved in warm liquid propane under pressure, and a high molecular weight viscous material is precipitated by chilling the solution. This precipitate is separated off and the desired chemical condensation product is produced therefrom by subjecting it to oxidation by air blowing. This oxidation step is controlled so that the temperature does not rise to the point at which flashing or thermal decomposition would occur, i.e., below about 475° to 575° F. Suitable plasticizers of this kind are commercially available, in particular a specific series of paraffinic petroleum fraction condensation products known as the Kendex series, manufactured by Kendall Refining Company of Bradford, Pennsylvania. It should be emphasized that these materials are derivatives of paraffinic base crude oil, and must be clearly distinguished from products derived from aromatic base hydrocarbons. A flame retardant ingredient in the form of a chlorinated paraffin wax or chlorinated biphenyl is incorporated in the binder component conveniently by mixing it into a solution of the isobutylene styrene co-polymer and the suitable plasticizer in an inert organic solvent.

An excellent flame retardant which is compatible with the other ingredients of the vehicle component is selected from a series of flame retardants known commercially as the Chlorowax series. Chlorowax 70, the preferred of this series, is a white, pulverized, chlorinated resinous paraffin having a specific gravity of about 1.64 and a melting point of about 90° C. Chlorowax is insoluble in water, soluble in hydrocarbons, ketones, esters, nitroparaffins and chlorinated hydrocarbons. It does not oxidize, polymerize or condense, and decomposes at 135° C. with evolution of hydrogen chloride. In the presence of antimony oxide, the hydrogen chloride reacts at flame temperature with the antimony oxide forming antimony oxychloride which acts as a flame retardant.

Other excellent flame retardants which are compatible with the other ingredients of the vehicle component are selected from a series of flame retardants known commercially as the Aroclor series. Aroclor 5460, the preferred of this series, is a yellow transparent solid composed of a mixture of chlorinated biphenyl and chlorinated poly-phenyls having a specific gravity of about 1.67 and a melting point of about 100° to 105.5° centigrade. The Aroclor is soluble in most common organic solvents, thinners, and oils. The Aroclor is insoluble in water, glycerine, glycols and lower molecular weight alcohols. It does not oxidize, polymerize or condense, and decomposes at a temperature above 335° centigrade with evolution of hydrogen chloride. In the presence of antimony oxide, the hydrogen chloride reacts with the antimony oxide forming antimony oxychloride which acts as a flame retardant. The preferred proportion of the chlorinated paraffin wax or chlorinated biphenyl in the vehicle component is from 10 to 35 percent by weight.

The filler component of the composition preferably comprises a mixture of one or more fibrous and non-fibrous reinforcing fillers. Examples of preferred non-fibrous fillers are pulverized mica, talc and metal oxide. Antimony oxide is especially preferred since it will react with gaseous hydrogen chloride liberated at flame temperatures by the chlorinated ingredient present in the binder, to yield antimony oxychloride, which also has good fire resistive properties. Preferred examples of fibrous fillers are asbestine (fibrous magnesium silicate) and asbestos. These fibrous materials serve to form a mat which aids in holding the other components of the mastic composition together both in normal service and when exposed to fire. For optimum results the asbestos should be of a smooth and flexible type, and for this reason Canadian chrysotile asbestos is preferred. Cape blue asbestos (crocidolite) and amosite asbestos should be avoided, since they tend to be rough and brittle.

In general the particle sizes of the non-fibrous ingredients of the filler are not critical, but where the composition is to be applied by spraying they should be below 1/32 inch in order to avoid clogging the spray gun. The preferred grade of asbestos for use with this invention is that known as Canadian 7R, which has a maximum fiber length of about 1/16 inch. However, fibers much shorter than 1/16 inch are quite suitable, and for example asbestos with fibers only 1/32 inch long has been used quite successfully as the fibrous filler; while fiber lengths greater than 1/16 inch, such as Canadian 5R, which has a maximum fiber length of about 1/4 inch, may also be used widely in accordance with this invention. Fibers longer than this should not be utilized in compositions that are to be applied by spraying, since the longer fibers tend to clog the spraying equipment; fibers longer than 1/4 inch also trowel with difficulty. In the filler component the relative amounts of ingredients are not critical and can vary considerably. However, when the following fillers are used, the asbestine preferably should be present in an amount about 35 to 65 percent of the total filler, mica or talc about 5 to 15 percent, asbestos about 5 to 45 percent, and antimony oxide about 5 to 15 percent.

A gelling agent is preferably incorporated in the filler component so as to render the composition thixotropic. The gelling agent thus imparts a "false body" to the composition, by diminishing flow without increasing true viscosity, which makes application by brushing, spraying or troweling easier. Because of their effectiveness at low concentrations the preferred gelling agents are the bentonitic type, i.e., organic derivatives of montmorillonite, which is a hydrous aluminum silicate having an expanding lattice. One such material is the product manufactured by National Lead Company of New York City and known as Bentone. Gelling agents of the bentonitic type have been found effective in the coating compositions of this invention at concentrations of 5 to 15 percent of the filler component.

The intumescing ingredient is used in the form of the naturally occurring vermiculite ore which is pulverized and the portion passing through U.S. Standard #10 mesh sieve but retained on #20 mesh sieve is selected as best for these compositions. Ore coarser than 10 mesh makes a rough and lumpy coating which cannot be sprayed satisfactorily, and ore finer than 20 mesh does not have the property of expanding to a useful extent when heated. If the compound is to be applied by troweling, ore as coarse as 5 mesh can be used.

It has been found desirable to include as much vermiculite ore in the mastic binder as is possible without making the compound too stiff and unworkable. When the composition, including solvent, is applied in a wet thickness of 1/4 inch and the volatile solvent is permitted to evaporate, exposure to fire causes the intumescent agent to expand in volume. The heat of the fire also causes the mastic binder to soften permitting this expansion to take place. For maximum expansion it is necessary that the temperature rise be nearly instantaneous and a minimum temperature of 700° F. must be reached quickly. If the compound is heated slowly a gradual hardening of the binder occurs so that when a temperature of 700° F. is reached the binder is not soft enough to permit appreciable expansion to occur, and in consequence the compound does not intumesce. If the proportion of intumescent ore in the coating is greater than 65 percent, the char resulting from fire exposure and subsequent expansion is very weak and falls away from the surface. Since the primary function of the intumescent coating is to form a self-supporting char to prevent rapid transfer of heat to the underlying surface, the integrity and adhesion of the char under fire conditions are very important.

It is also important that the organic binder medium does not soften when exposed to fire to the extent of running or sagging. Such behavior would greatly diminish the intumescent action and would permit the coating to run and drip away from the surface.

A typical applied coating of the composition disclosed and containing 60% by volume of solvent, when applied 0.25 inch thick will shrink by evaporation of the volatile solvent to an approximate 0.10 inch. When this dried coating is exposed to a fire such as that from a gas flame, the resulting intumescence reaches about 0.75 inch thickness. This swelling amounts to a volume increase of 7½ times. Nominally dry, unexpanded American vermiculite when heated above 700° F. will expand 12 to 18 times in volume, so it is seen that the mastic binder has a restricting effect on the vermiculite expansion. For this reason, it is preferable to use a mineral intumescing agent which has a dry expansion of at least 10 times.

The compositions of this invention are preferably prepared by dissolving the isobutylene co-polymer in the solvent, adding the chlorinated resin and the plasticizer, and then adding the filler component and the intumescing component. Obviously, however, the composition may be compounded in other ways if desired.

The fire retardant coating composition may be applied to the work in any convenient way, for example, either by spraying or troweling. Typical but non-limitative formulas found to be satisfactory in all of the foregoing respects are as follows:

*Example 1*

|  | Percent by wt. |
|---|---|
| Isobutylene-styrene copolymer | 9.82 |
| Plasticizer | 16.28 |
| Filler | 16.84 |
| Gelling agent | 2.50 |
| Intumescent agent | 44.74 |
| Resinous chlorinated compound | 9.82 |
|  | 100.00 |

*Example 2*

|  | Percent by wt. |
|---|---|
| Isobutylene-isoprene copolymer | 7.12 |
| Plasticizer | 11.76 |
| Asbestine | 10.00 |
| Asbestos fiber | 3.00 |
| Antimony oxide | 1.00 |
| 10/20 mesh vermiculite ore | 60.00 |
| Resinous chlorinated paraffin | 7.12 |
|  | 100.00 |

Example 3

| | Percent by wt. |
|---|---|
| Linear isobutylene polymer | 13.34 |
| Plasticizer | 22.07 |
| Asbestine | 12.50 |
| Pulverized mica | 10.00 |
| Asbestos fiber | 1.50 |
| 6/20 mesh vermiculite ore | 25.00 |
| Gelling agent | 2.26 |
| Resinous chlorinated paraffin | 13.33 |
| | 100.00 |

Example 4

| | Percent by wt. |
|---|---|
| Isobutylene-styrene copolymer | 17.45 |
| Plasticizer | 15.59 |
| Filler | 24.51 |
| 10/20 mesh vermiculite ore | 30.00 |
| Resinous chlorinated biphenyl | 12.45 |
| | 100.00 |

Example 5

| | Percent by wt. |
|---|---|
| Isobutylene-styrene copolymer | 15.68 |
| Plasticizer | 12.66 |
| Filler | 20.98 |
| 10/20 mesh vermiculite ore | 40.00 |
| Resinous chlorinated poly-phenyl | 10.68 |
| | 100.00 |

Example 6

| | Percent by wt. |
|---|---|
| Asphalt (85/100 penetration) | 24.78 |
| Chlorinated paraffin (70% chlorine) | 7.89 |
| Isobutylene-styrene copolymer | 11.26 |
| Antimony oxide | 1.39 |
| Asbestine | 19.49 |
| Pulverized mica, 325 mesh | 5.02 |
| Asbestos fiber, 7R | 6.29 |
| Unexpanded vermiculite, 10/20 mesh | 23.88 |
| | 100.00 |

The compositions described above produce fire retardant coatings which have an optimum combination of toughness, flexibility, and hardness under most weather conditions, and which intumesce strongly when exposed to fire.

The vehicle which binds together the pigment or mineral filler and intumescent agent must be permanently thermoplastic so that upon application of heat it will soften to permit maximum expansion of the intumescent agent. At the same time the vehicle must not support combustion nor must it flow freely at the temperature of intumescence or crumble away on charring so that the mastic will remain in place, thereby functioning as a barrier against heat conductance to the vessel. There must not be so much pigment in the formulation as to permit it to absorb the vehicle and bind the latter so tightly that the thermoplastic behavior thereof and the vermiculite expansion are inhibited.

Suitable resins for use as vehicle components are asphalts, tars, pitches, polymers and elastomers, all of which must be substantially non-oxidizing to prevent loss of thermoplasticity through ageing. Since charring results from incomplete combustion, it can be controlled to prevent the char from crumbling away by selecting resins and fillers so that the vehicle is deprived of oxygen sufficient for complete combustion. To serve a useful purpose, the nature of the vehicle and the nature and particle size of the intumescing agent should be such that the mastic itself will expand at least two-fold in volume when exposed to fire.

While preferred embodiments of the invention have been described herein, skilled artisans may make minor variations without departing from the spirit of the invention and the scope of the appended claims.

We claim:

1. An intumescent fire retardant mastic coating composition comprising an intumescing agent, a vehicle and a filler, said intumescing agent comprising about 20-65 percent by weight granular unexpanded vermiculite having a particle size of about 5-20 mesh, said filler being present in about 10-50 percent by weight, said vehicle comprising the remainder of the composition and including 20-40 percent by weight of a polymeric material, 20-60 percent by weight of a plasticizer and 10-35 percent by weight of a chlorinated resin, said polymeric material being selected from the group consisting of linear isobutylene polymer, isobutylene-styrene copolymer and isobutylene-isoprene copolymer, said plasticizer being constituted by a paraffin base petroleum distillation residue condensation product derived from a naturally contained high molecular weight viscous material precipitated from a warm propane solution of a residual paraffin base oil fraction which has undergone no thermal decomposition or chemical change beyond that induced by ordinary fractional distillation, said condensation product being characterized by an iodine number not substantially above 40, a softening point of between about 110° F.-200° F., an average molecular weight of at least about 1900 and at least 40 carbon atoms per double bond, said chlorinated resin being selected from the group consisting of chlorinated paraffin, chlorinated biphenyl, chlorinated polyphenyl and selected mixtures thereof.

2. The composition of claim 1 wherein said filler includes a gelling agent, said gelling agent comprising an organic derivative of montmorillonite and constituting about 5-15 percent of the entire filler.

3. The composition of claim 1 wherein the melting point of the chlorinated resin is between about 90° C.-105.5° C.

References Cited in the file of this patent

UNITED STATES PATENTS

| 2,218,965 | Young et al. | Oct. 22, 1940 |
| 2,335,097 | Aken | Nov. 23, 1943 |
| 2,337,336 | McCluer | Dec. 21, 1943 |
| 2,390,732 | Page | Dec. 11, 1945 |
| 2,569,399 | Burns et al. | Sept. 25, 1951 |
| 2,590,211 | Rugar | Mar. 25, 1952 |
| 2,667,425 | Bierly | Jan. 26, 1954 |
| 2,756,159 | Kendall et al. | July 24, 1956 |